United States Patent [19]
Antonevich

[11] 3,793,704
[45] Feb. 26, 1974

[54] METHODS OF ASSEMBLING JOINTS

[75] Inventor: John N. Antonevich, Jamestown, N.Y.

[73] Assignee: Blackstone Corporation, Jamestown, N.Y.

[22] Filed: July 24, 1972

[21] Appl. No.: 274,173

[52] U.S. Cl. .............. 29/470.1, 29/470.5, 29/503, 29/525, 228/1, 228/40
[51] Int. Cl. .............................................. B23k 21/00
[58] Field of Search.... 29/470.1, 492, 503, 157.3 R, 29/525, 470.5; 228/1, 36, 37, 40; 113/116

[56] References Cited
UNITED STATES PATENTS

| | | | |
|---|---|---|---|
| 2,417,662 | 3/1947 | Rosales | 29/157.3 R |
| 3,249,281 | 5/1966 | St. Jean | 228/1 |
| 3,528,166 | 9/1970 | Portal et al. | 29/470.1 X |
| 3,543,383 | 12/1970 | Freemar et al. | 29/470.1 |
| 3,666,520 | 5/1972 | Terai et al. | 29/492 |
| 3,680,200 | 8/1972 | Terrill et al. | 29/503 |

Primary Examiner—J. Spencer Overholser
Assistant Examiner—Robert J. Craig
Attorney, Agent, or Firm—Buell, Blenko & Zeisenheim

[57] ABSTRACT

A method of assembling parts is provided in which a pair of interfitting surfaces adapted for press fitting are formed on the two parts, a driving force is applied to the two parts urging them axially together while a superposed vibrating force is applied to at least one of the two parts to cause the interfitting parts to engage and dipping said parts into a bath of molten metal.

5 Claims, 5 Drawing Figures

METHODS OF ASSEMBLING JOINTS

This invention relates to method of assembling joints and particularly to a method of force fitting parts of an assembly with ultrasonic vibrations to permit subsequent dipping of assembly into molten metal for soldering of such fittings.

The problem of assembling joints, as in the manufacture of tube assemblies, for soldering is well known and has troubled the art for many years. In conventional methods of assembling such parts it is common practice to fixture loose members in position and then with a torch to heat the joint and the solder to allow the solder to flow into the joint. Alternatively the parts surfaces to be joined are pretinned in a molten bath and then force fit the parts under heat until the tinning alloy flows into the joint. Both of these techniques require fixturing or similar means for holding the parts during the soldering operation.

I preferably provide a method of assembling joints by the steps of forming on the ends of two parts to be joined a pair of interfitting surfaces adapted for press fitting spaced from the end of the outer of said two parts, applying a driving force to the said two parts urging the interfitting surfaces together while simultaneously superposing vibratory energy to at least one of said parts to cause the interfitting surfaces to engage and dipping said interfitting parts into a bath of molten metal. Preferably the solder bath is ultrasonically activated while the parts are being dipped. The superposed vibratory force may be applied to the parts being joined in any direction but is preferably applied in the direction of the driving force.

In the foregoing general description I have set out certain objects, purposes and advantages of my invention. Other objects, purposes and advantages of this invention will be apparent from a consideration of the following description and the accompanying drawings in which.

Figure 1:
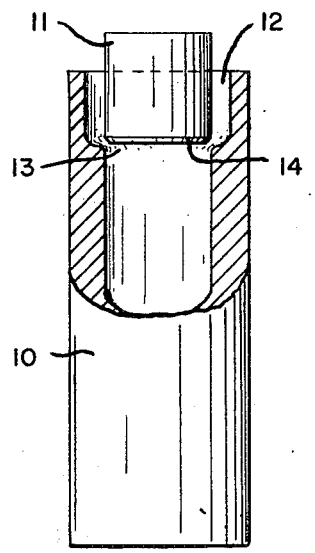
FIG. 1 shows a pair of parts to be joined according to my invention.

Referring to the drawings, I have shown an outer part 10 and an inner part 11 to be joined. The outer part 10 is relieved at its end to form a cup-like recess 12 surrounding the exterior of part 11 into which solder may flow. A driving force, such as a hydraulic ram (not shown) is applied against the two parts 10 and 11 urging them axially together so that interfitting faces 13 and 14 engage with the simultaneous imposition of a superposed vibratory motion on the parts being joined. The joint is finished by dipping in solder to fill the cup-like recess 12 with solder.

Figure 2:
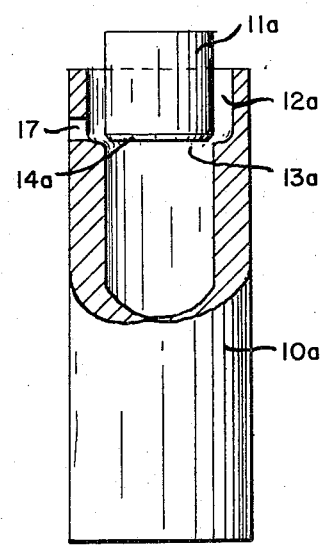
FIG. 2 shows a pair of parts to be joined according to a second embodiment of my invention.

In the embodiment of FIG. 2, I have shown a structure similar to that of FIG. 1 with like parts bearing like numbers with the addition of the suffix a. This embodiment includes a notch 17 in the part 11 which acts as a gas pressure relief to atmosphere.

Figure 3:
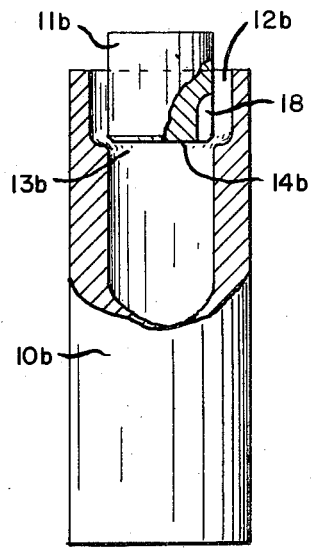
FIG. 3 shows a pair of parts to be joined according to a third embodiment of my invention.

Similarly in the embodiment of FIG. 3, I have shown a structure similar to that of FIG. 1 with like parts bearing like numbers with the addition of suffix b. This embodiment includes a gas relief passage 18 through the sidewall of pocket recess 12b which acts as a gas pressure relief.

Figure 4:
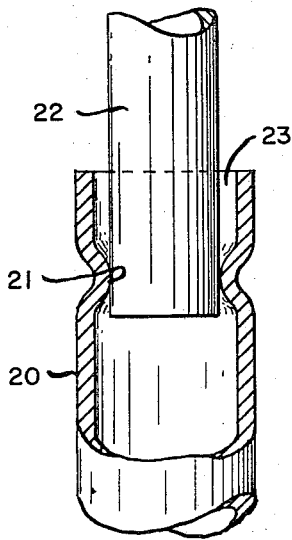
FIG. 4 shows a pair of parts to be joined according to a fourth embodiment of my invention.

In FIG. 4 I have shown another method of providing the two interfitting surfaces. In FIG. 4 the outer part 20 is upset to form an inwardly projecting annulus 21 adapted to engage the inner part 22, leaving a recess 23 for receiving solder. Again the parts are assembled using an axial driving force with a superposed vibratory force.

Figure 5:
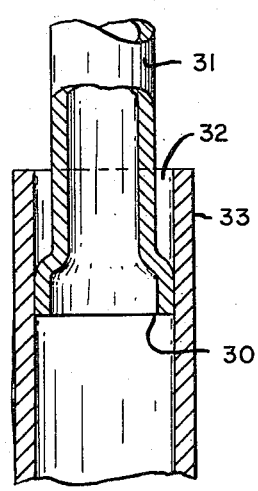
FIG. 5 shows a pair of parts to be joined according to a fifth embodiment of my invention.

FIG. 5 shows another form in which the end 30 of an inner member 31 is expanded to fit tightly into the end 32 of an outer member 33 and the two parts are forced together with an axial driving force with a superposed vibratory force.

In all cases the joint is dipped after assembly into a bath of molten metal without need for jigs or supports.

In the foregoing specification I have set out certain preferred practices and embodiments of my invention, however, it will be understood that this invention may be otherwise embodied within the scope of the following claims.

I claim:

1. A method of assembling joints comprising the steps of:
   a. forming on the ends of two parts, one inner and one outer to be joined in telescoping arrangement a pair of interfitting surfaces adapted for press fitting with an open cup like recess between them;
   b. applying a driving force to the said two parts urging the interfitting surfaces together while simultaneously superposing ultrasonic energy to at least one of said parts to cause the interfitting surfaces to engage into telescoping arrangement and to form a fitted joint; and
   c. dipping said interfitted parts into a bath of molten metal to thereby fill the resulting cup-like recess and to finished said fitted joint.

2. A method of assembling joints comprising the steps of:
   a. forming on the ends of two parts to be joined a pair of interfitting surfaces adapted for press fitting in telescoping arrangement with a vented cup like recess between them;
   b. applying a driving force to the said two parts urging the interfitting surfaces together while simultaneously superposing vibratory energy to at least one of said parts to cause the interfitting surfaces to engage into telescoping arrangement and to form a fitted joint; and
   c. dipping said interfitted parts into a bath of molten metal which is ultrasonically activated to fill the resulting cup-like recess and to finished said fitted joint.

3. A method of assembling joints comprising the steps of:
   a. forming on the ends of two parts to be joined a pair of interfitting surfaces adapted for press fitting spaced from the end of the outer of said two parts and to define an open cup-like recess between said parts;
   b. applying a driving force to the said two parts urging the interfitting surfaces together while simultaneously superposing ultrasonic energy to at least one of said parts to cause the interfitting surfaces to engage said parts into a press fitted arrangement thereby forming a fitted joint, said superposed ultrasonic force being applied to the parts being joined in the direction of said driving force; and c. dipping said interfitted parts into a bath of molten metal to fill the resulting cup-like recess and to finish said joint.

4. A method of assembling joints comprising the steps of:
 a. forming on the ends of two parts to be joined a pair of interfitting surfaces adapted for press fitting in telescoping arrangement with a vented cup like recess between them;
 b. applying a driving force to the said two parts urging the interfitting surfaces together while simultaneously superposing vibratory energy to at least one of said parts to cause the interfitting surfaces to engage into telescoping arrangement and to form a fitted joint; said superposed vibratory force being applied to the parts being joined in a direction transverse to the direction of said driving force; and
 c. dipping said interfitted parts into a bath of molten metal to thereby fill the resulting cup-like recess and to finish said joint.

5. A method of assembling joints comprising the steps of:
 a. forming on the ends of two parts to be joined a pair of interfitting surfaces adapted for press fitting in telescoping arrangement, said interfitting parts forming a pocket between said parts adapted to receive solder;
 b. applying a driving force to the said two parts urging the interfitting surfaces together while simultaneously superposing vibratory energy to at least one of said parts to cause the interfitting surfaces to engage into telescoping arrangement and to form a fitted joint; and
 c. dipping said interfitted parts into a bath of molten metal to thereby fill said resulting pocket and thereby finish said joint.

* * * * *

UNITED STATES PATENT OFFICE
CERTIFICATE OF CORRECTION

Patent No. 3,793,704          Dated February 26, 1974

Inventor(s) John N. Antonevich

It is certified that error appears in the above-identified patent and that said Letters Patent are hereby corrected as shown below:

The name of the Firm should read
      --Buell, Blenko & Ziesenheim--.

Column 2, Claim 1, line 41, "finished" should
      read --finish--.

Column 2, Claim 2, line 55, "finished" should
      read --finish--.

Column 3, Claim 4, line 20, after "joint"
      delete the semicolon and insert a comma.

Signed and sealed this 17th day of September 1974.

(SEAL)
Attest:

McCOY M. GIBSON JR.　　　　　　　C. MARSHALL DANN
Attesting Officer　　　　　　　　Commissioner of Patents